United States Patent [19]

Gray

[11] 4,280,777
[45] Jul. 28, 1981

[54] BALED HAY HANDLING APPARATUS

[76] Inventor: Thomas C. Gray, P.O. Box 67, Rte. 3, Iva, S.C. 29655

[21] Appl. No.: 115,089

[22] Filed: Jan. 24, 1980

[51] Int. Cl.³ .............................................. B66F 9/18
[52] U.S. Cl. ............................... 414/24.6; 242/86.5 R; 294/88; 414/911; 414/739
[58] Field of Search .................... 414/607, 608, 24.5, 414/24.6, 911, 739, 743, 722, 740, 734, 723; 294/88; 56/343; 242/86.5 R

[56] References Cited

U.S. PATENT DOCUMENTS

| 3,587,218 | 6/1971 | Geary | 414/739 X |
| 3,677,428 | 7/1972 | Mallett | 294/88 X |
| 3,880,305 | 4/1975 | Van Polen | 414/24.6 |
| 4,049,140 | 9/1977 | Roose | 414/24.6 |
| 4,194,863 | 3/1980 | Vansickle et al. | 414/24.5 |

FOREIGN PATENT DOCUMENTS 2337496  8/1977  France ..................... 414/24.6

Primary Examiner—Frank E. Werner

Attorney, Agent, or Firm—Bailey, Dority & Flint

[57] ABSTRACT

Apparatus adapted to be attached to the boom arms of a conventional tractor supported front end loader for use in engaging, lifting, unrolling and performing other handling requirements of a large rolled round bale of hay. The apparatus includes frame elements designed to be operatively and removably secured to the boom arms of a front end loader to provide operating support for a pair of horizontally spaced and adjustable bale clamping arms, with an actuator operatively connected to the bale clamping arms and operable of effecting adjustment of the bale clamping arms between a closed bale clamping position and an open bale release and receiving position. A pair of disk elements are coaxially and rotatably mounted on the extended ends of the bale clamping arms and detailed to include bale engaging projections whereby a bale can be engaged and rotatably supported by the disk elements between the clamping arms. Conventional adjustment of the boom arms will permit the bale to be elevated in loading and other bale handling operations.

2 Claims, 5 Drawing Figures

BALED HAY HANDLING APPARATUS

BACKGROUND OF THE INVENTION

The recent trends in handling hay in a cattle feeding operation is to process, by rolling and compressing, the hay into very large rolls. These large rolls will allow one single roll of hay to contain an amount equal to many small bales and will thus reduce the amount of labor required to effectively handle the hay during gathering, hauling, storing and feeding. Further, these large rolls of hay can be more effectively stored in the open air with a reduced loss of product due to spoiled or damaged hay.

One problem that develops due to the creation of these large rolls of hay is the provision of effective equipment for handling the large hay rolls, since their size will prevent individuals from handling the large rolls of hay.

A number of attempts have been made to develop apparatus which can be used in the handling of large hay rolls. However, the prior art apparatus require special vehicle means or require considerable modification to existing equipment.

Certain of the prior art apparatus is designed to elevate and load the large hay rolls onto vehicle transport means, with additional apparatus required for unrolling the bales in a cattle feeding operation.

Further, the prior art apparatus is complex in construction, expensive to manufacture, and often unreliable in operation.

SUMMARY OF THE INVENTION

The above indicated disadvantages have been overcome by the present invention which basically includes a hay handling attachment which can be added to the boom arms of a conventional front end loader and can be used in elevating and loading the large hay rolls onto vehicle transport means, can be used to retrieve large hay rolls from a stored location, and can be used to unroll the hay rolls during a cattle feeding operation.

A primary object of the present invention is to provide hay handling equipment which can be easily added to or removed from the conventional boom arms of tractor supported front end loader, without modification of the boom arms.

A further object of the present invention is to provide a rolled hay handling apparatus which will effect an unrolling of the hay by supporting the hay in contact with a surface and by producing rolling movement of the hay roll relative to the surface.

Still another object of the present invention is to provide a hay handling attachment which can be added to the boom arms of a conventional front end loader and can be remotely operated during a hay handling operation.

Another object of the present invention is to provide a front end loader attached hay handling apparatus which includes adjustment means independent of the front end loader.

Additional objects and advantages of the details of construction will become apparent after reading the following description of the preferred embodiment with reference to the attached drawings.

DESCRIPTION OF A PREFERRED EMBODIMENT

Figure 1:
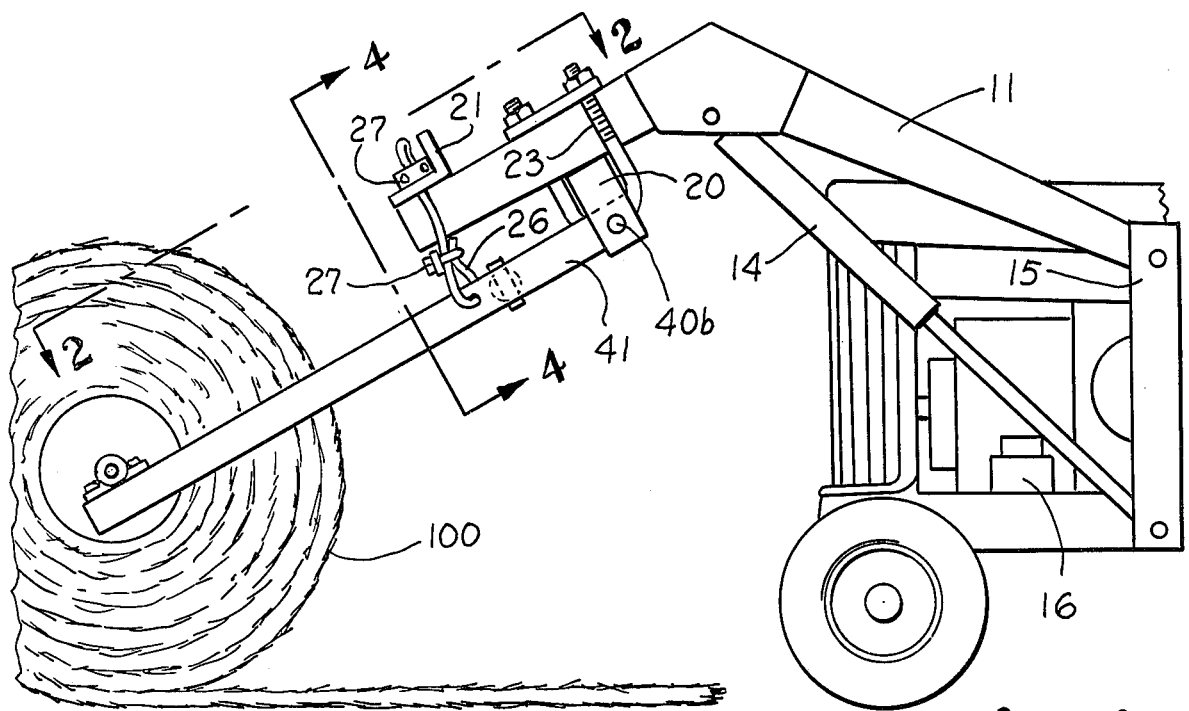
FIG. 1 is a side elevational view showing the hay handling apparatus of the present invention with parts of the tractor and hay roll being broken away.

Referring to the drawings, the hay handling apparatus embodying the principles of the present invention will be described relative to a conventional tractor supported front end loader having a pair of boom arms 10, 11 with hydraulic cylinder means 14 used for effecting elevating adjustment of the boom arms. The hay handling apparatus of the present invention will be described relative to boom arm attached frame elements 20, 21, bale clamping arms 40, 41, bale supporting disk 30, 31, and clamping arms adjustment means 50.

Figure 3:
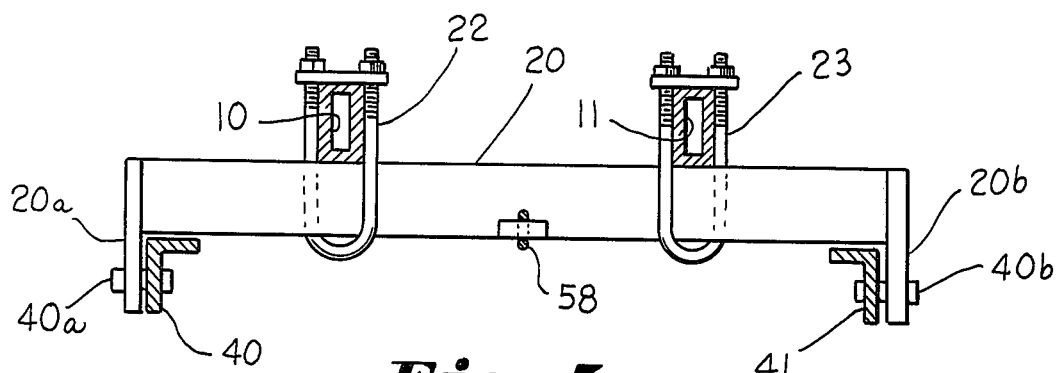
FIG. 3 is an enlarged vertical sectional view taken along lines 3—3 of FIG. 2.
Figure 4:
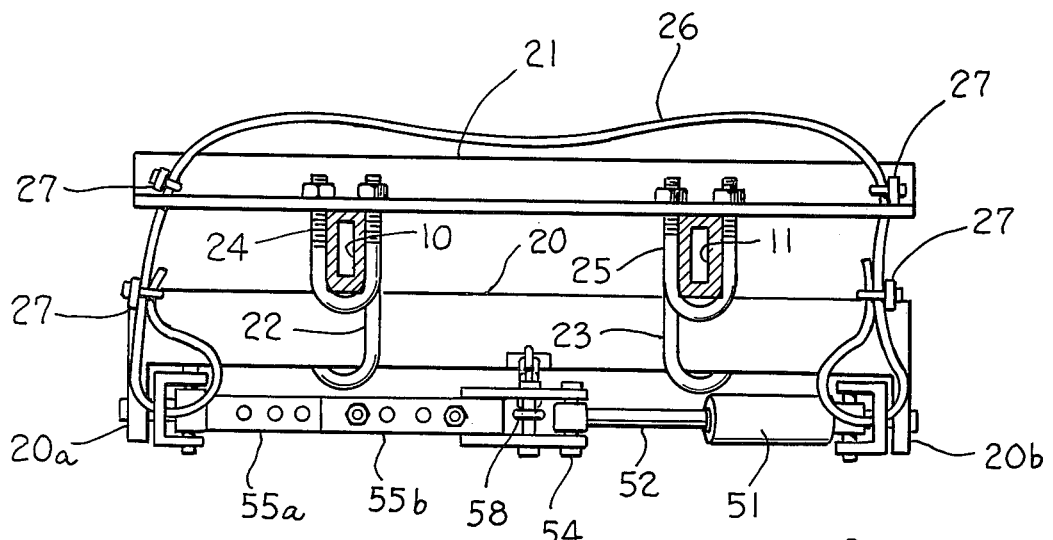
FIG. 4 is an enlarged vertical sectional view taken along lines 4—4 of FIG. 1.

As shown in FIG. 1, the front end loader boom arms 10, 11 are pivotally supported by frame standards 15 which are attached to a conventional farm tractor 16, with cylinders 14 being used to effect elevating adjustment of the boom arms. To utilize the hay handling apparatus of the present invention, the conventional loading bucket (not shown) is removed from the foward ends of boom arms 10, 11 and a pair of frame elements 20, 21 are clamped to the arms as shown in FIGS. 1-4. Elongated frame element 20 is fabricated from conventional stock material and is provided with a pair of end plates 20a, 20b which provide a pivotal support for clamping arms 40, 41 as will be described below. Frame element 20 is transversely and horizontally oriented beneath boom arms 10, 11 and is clamped thereto by a pair of conventional U-bolt clamping elements 22, 23 (FIG. 3). Frame element 21 is transversely and horizontally oriented above boom arms 10, 11 and is secured thereto by conventional U-bolt clamping elements 24, 25 (FIG. 4). The frame elements 20, 21 can be easily added to or removed from the boom arms 10, 11 effecting adjustment of the U-bolt clamping elements.

Figure 5:
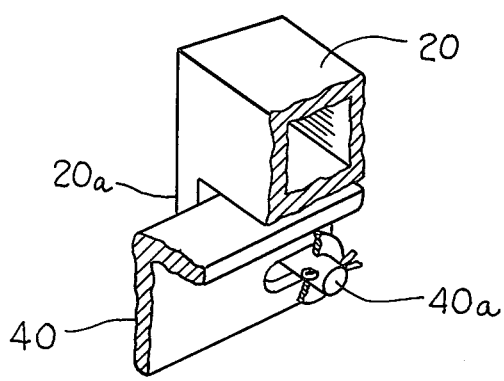
FIG. 5 is an enlarged fragmentary perspective view showing the pivotal connection between a frame element and a clamping arm.

As shown in FIGS. 1, 3 and 5, the pair of clamping arms 40, 41 are pivotally supported of frame element end plates 20a, 20b, respectively by pivot pins 40a, 40b. Pivot pins 40a, 40b are coaxially aligned and extend through slot-type openings 45 formed adjacent the ends of clamping arms 40, 41. The slot-type openings 45 will permit both vertical adjustment of the clamping arms 40, 41 about the axis of pivot pins 40a, 40b and lateral adjustment of the clamping arms 40, 41 between an open bale receiving and release position and a closed bale clamping position.

A vertical adjustment of clamping arms 40, 41 relative to boom arms 10, 11 is effected by a flexible cable assembly 26 which includes a number of cable clamping elements 27. Opposite ends of cable 26 are inserted down through openings (not shown) formed adjacent opposite ends of frame element 21 with ends of cable 26 being inserted around and through openings (not shown) formed in clamping arms 40, 41 (FIGS. 1 and 4). The clamping elements 27 are utilized to secure the opposite ends of cable 26 with a pair of clamping elements 27 being secured to cable 26 above frame element 21 to hold the clamping arms 40, 41 in a selected adjusted position. Vertical adjustment of clamping arms 40, 41 relative to boom arms 10, 11 can be accomplished by adjusting the position of clamping elements 27 along cable 26. The use of flexible cable 26 will serve both to secure the clamping arms 40, 41 in an adjusted position relative to boom arms 10, 11 and will permit lateral adjustment of the clamping arms between the open and closed positions.

Figure 2:
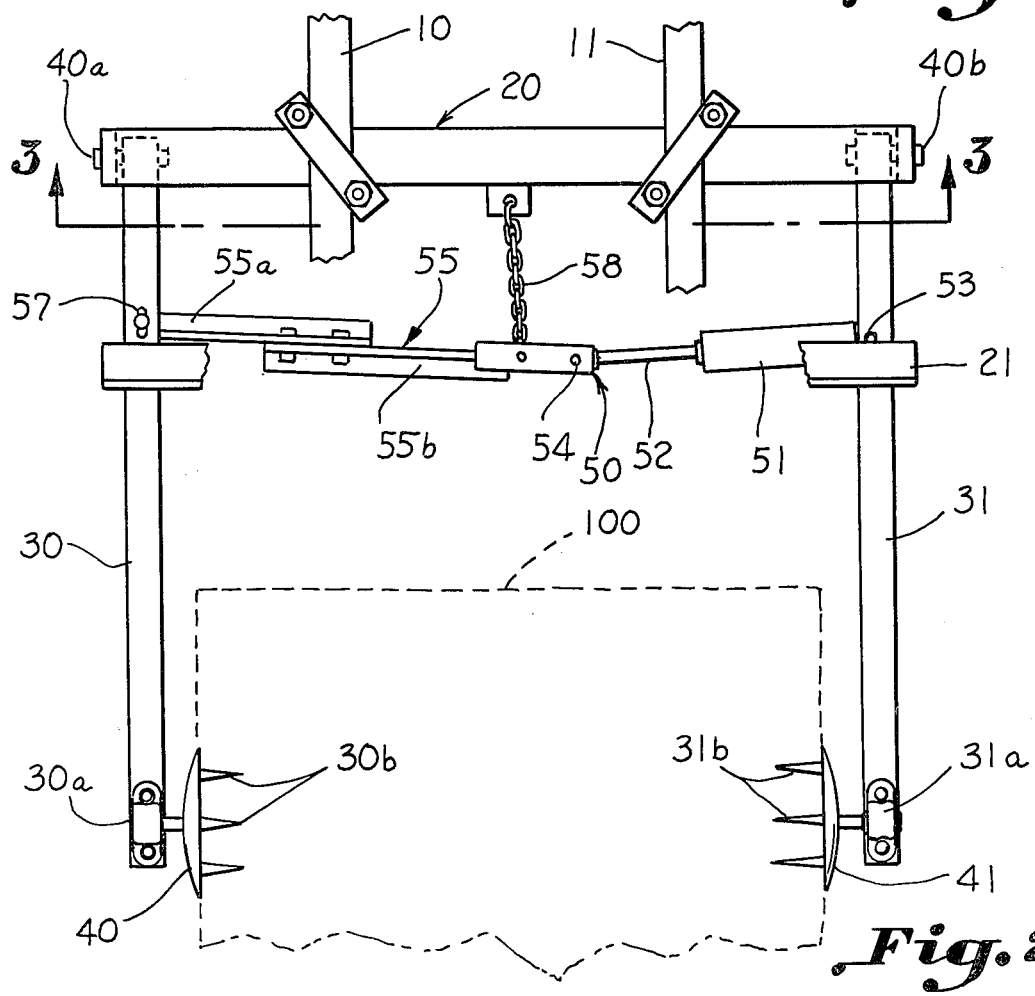
FIG. 2 is a fragmentary top plan view as seen along lines 2—2 of FIG. 1 with parts omitted and parts shown broken away for purposes of clarity.

As shown in FIGS. 2 and 4, lateral adjustment of clamping arms 40, 41 between the open and closed positions is effected by an actuator assembly 50 which includes a conventional hydraulic cylinder 51 having an operable piston rod 52. One end of cylinder 51 is pivotally connected at 53 to clamping arm 41 with an extended end of piston rod 52 being pivotally connected at 54 to an actuator link 55. Actuator link 55 includes a pair of overlapping link elements 55a, 55b which can be adjusted in length by conventional bolt and opening adjustment means 56. An opposite end of link 55 is pivotally connected at 57 to clamping arm 40. The actuator assembly 50 is detailed in length when in the fully closed clamping position to include an over-center relationship relative to frame element 20. The over-center relationship of actuator assembly 50 will insure an outward swinging movement of clamping arms 40, 41 to an open position in response to expansion of cylinder 51. A limit of the over-center relationship of actuator assembly 50 is maintained by a chain element 58 which is connected between frame element 20 and actuator assembly 50 (FIG. 2).

As shown in FIGS. 1 and 2, a pair of bale supporting disks 30, 31 are rotatably supported adjacent the forward ends of arms 40, 41 by conventional bearings 30a, 31a. Disks 30, 31 are supported for coaxial rotation about a horizontal transverse axis. Each of the disks 30, 31 include a number of inwardly projecting spikes 30b, 31b. Spikes 30b, 31b are detailed for penetrating the sides of a large round bale of hay, generally, represented by number 100 (FIG. 2).

In operation, the boom arm cylinders 14 and clamping arm cylinder 51 are remotely operated from the seat of the supporting tractor by conventional control means (not shown). To effect handling of a large round bale of hay, the boom arms 10, 11 are adjusted to the needed elevation to position the clamping disks 30, 31 which are adjusted to the open bale receiving position, adjacent opposite ends of a bale. Cylinder 51 is then adjusted to cause spikes 30b, 31b to pierce the bale and securely clamp disk 30, 31 against the ends of bale 100. Boom arms 10, 11 can then be adjusted to lift bale 100 to a desired elevation, either for loading onto a transport vehicle or for transport by the supporting tractor to a desired location.

Unrolling the bale 100 can be accomplished in a cattle feeding operation by lowering bale 100 into contact with a supporting surface and driving the tractor either forward or backward, depending on the direction of winding of the hay around bale 100.

A clamped and supported bale can be deposited when desired by operating cylinder 51 to move clamping arms 40, 41 to an open position which will withdraw spikes 30b, 31b from the ends of a supported bale.

While a preferred embodiment of the invention has been described using specific terms, such description is for illustrative purposes only, and it is to be understood that changes and variations may be made without departing from the spirit or scope of the following claims.

What is claimed is:

1. An apparatus for use on a conventional hydraulically operated front end loader carried on a conventional tractor, said front end loader including a pair of horizontally spaced boom arms, said apparatus comprising:
   a first horizontally oriented frame element;
   means for removably securing said first frame element to said spaced boom arms;
   a second horizontally oriented frame element;
   means for removably securing said second frame element to said spaced boom arms forward of said first frame element;
   a pair of elongated bale clamping arms;
   slotted joint means for pivotally connecting first ends of said bale clamping arms to said first frame element for swinging movement in a common plane between an open bale release position and a closed bale supporting position and for allowing outer ends of said bale clamping arms to be adjusted vertically relative to said spaced boom arms;
   adjustable flexible support means extending between said second element and said bale clamping arms permitting said arms to be moved horizontally between said opened and closed positions and for varying the angle between said clamping arms and said boom arms;
   actuator means connected between said clamping arms for effecting adjustment of said clamping arms between said open and closed positions; and
   a pair of disk elements, one supported on an extended end of each of said clamping arms and detailed for rotation about a common axis, and wherein each of said disk elements include a number of projections extending axially toward each other and detailed for engaging opposite sides of a bale when said clamping arms are adjusted to said closed bale supporting position.

2. The apparatus as set forth in claim 1 further comprising:
   said adjustable flexible support means including,
   (i) a flexible cable extending between said second element and said bale clamping arms, and
   (ii) means for adjusting the length of cable between said second element and said clamping arms for varying said angle between said clamping arms and said boom arms.

* * * * *